Patented Jan. 1, 1935

1,986,239

UNITED STATES PATENT OFFICE 1,986,239

PRODUCTION OF VALUABLE HYDROCARBONS FROM GASEOUS HYDROCARBONS

Fritz Winkler and Hans Haeuber, Ludwigshafen-on-the-Rhine, Germany, assignors to I. G. Farbenindustrie Aktiengesellschaft, Frankfort-on-the-Main, Germany No Drawing. Original application March 16, 1931, Serial No. 523,183. Divided and this application March 1, 1934, Serial No. 713,516. In Germany March 22, 1930

3 Claims. (Cl. 260—168)

This application has been divided out from application Ser. No. 523,183, filed March 16th, 1931, which relates to the production of valuable hydrocarbons from gaseous hydrocarbons of the paraffinic and olefinic series.

We have found that the conversion of normally gaseous saturated or olefinic hydrocarbons as for example methane, ethane, ethylene and the like, if desired in admixture with other gases, such as nitrogen or hydrogen, into hydrocarbons of higher molecular weight, especially into liquid hydrocarbons of aliphatic and aromatic nature, by heating the gases to high temperatures between 400° and 1100° C., is effected with particular advantage, if these gaseous hydrocarbons are first laden with cadmium vapor at a temperature which lies above the melting point and, if desired, above the boiling point of cadmium but below the said conversion temperature of the said gases and then heated in the presence of said cadmium vapor to the said conversion temperature.

The gases may be laden with cadmium vapor by being passed through molten or boiling cadmium, or by injecting into them cadmium vapor or gases, for example diluent or indifferent gases, such as nitrogen or hydrogen, containing said vapor.

The cadmium is usually added to the gases to be treated or under treatment in small amounts, for example in an amount of about up to 2 per cent by volume, to the said gases, but also greater amounts of cadmium vapor may be added though the effect obtained is not substantially increased thereby. There exists no lower limit of the amounts of cadmium vapor to be employed since even traces as for example 0.01 per cent of cadmium vapor have a remarkably favorable effect on the treated gases.

The mixtures containing the cadmium vapor may also be led over catalysts, such as those used in pyrogenic reactions, as for example over silicon, molybdenum, tungsten, chromium or carbon in various forms such as graphite, coke and the like, the heat necessary for the reaction being supplied by the catalysts if desired, instead of through the walls, by employing them as electrical resistances. Such catalysts are advantageously employed as do not give rise to a deposition of carbon. By working thus with solid catalysts, inter alia, a better utilization of the heat is ensured. The walls of the reaction chamber are preferably constructed of or coated with a material which prevents the deposition of carbon, as for example chromium, graphite, tin, tin alloys, as for example with lead, and the like.

The process according to the present invention may be carried out at any pressure under which at the temperature employed the vapor pressure of the cadmium is so high that the cadmium vapor may be present in an amount of 0.01 per cent of the hydrocarbon gases treated. The reaction temperature is generally speaking between 400° and 1100° C., and advantageously above about 500° C. but varies according to the hydrocarbons to be converted and to the other working conditions. At temperatures below from 700° to 750° C. mainly aliphatic hydrocarbons are obtained, whereas above this interval the formation of aromatic hydrocarbons predominates.

In general, the higher the number of carbon atoms in the molecule, of the initial gaseous hydrocarbons, the lower will be the temperature required.

The following example will further illustrate the nature of this invention, but the invention is not restricted to this example. The percentages are by volume unless otherwise specified.

Example

About 23.3 liters of a gas having the composition butane 0.7 per cent, propane 65.3 per cent, ethane 22.2 per cent, butylene 0.3 per cent, propylene 8.7 per cent and ethylene 2.8 per cent which have been laden with cadmium vapor are led per hour through an internally tinned tube of V2A-steel that is, a steel containing 7.5 to 9 parts of nickel, 15 to 17 parts of chromium and the balance of iron with minor amounts of carbon having an internal diameter of 18 millimeters and a length of about 60 centimeters and which has been heated to from 750° to 775° C.

The reaction product consists of about 46 liters of a gas containing 4.5 per cent of propylene, butylene and a little butadiene, 25.5 per cent of ethylene, 21.2 per cent of hydrogen and 48.9 per cent of methane and 5 grams of a condensate boiling above 40° C. which consists mainly of aromatic compounds of low boiling point. 70 per cent of this condensate boil below 200° C.

12.5 per cent by weight of propylene, butylene and a little butadiene, 35.2 per cent by weight of ethylene, 12.5 per cent by weight of liquid hydrocarbons, 37.8 per cent by weight of methane and 2.0 per cent by weight of hydrogen are obtained from the gas employed.

What we claim is:—

1. In the conversion of a normally gaseous hydrocarbon selected from the paraffinic and olefinic series into liquid hydrocarbons by heat treatment at a temperature, between 400° and 1100° C., sufficient for carrying into effect this conversion, the steps of charging the said gaseous hydrocarbon with cadmium vapor at a temperature which lies so much above the melting point of cadmium that at the pressure employed the cadmium vapor may be introduced into said gaseous hydrocarbon in an amount of at least 0.01 per cent with reference to this hydrocarbon, but below the said conversion temperature, and then heating said gaseous hydrocarbon to the said conversion temperature.

2. In the conversion of a normally gaseous hydrocarbon selected from the paraffinic and olefinic series into liquid hydrocarbons by heat treatment at a temperature, between 400° and 1100° C., sufficient for carrying into effect this conversion, the steps of charging the said gaseous hydrocarbon with cadmium vapor at a temperature which lies so much above the boiling point of cadmium that at the pressure employed the cadmium vapor may be introduced into said gaseous hydrocarbon in an amount of at least 0.01 per cent with reference to this hydrocarbon, but below the said conversion temperature, and then heating said gaseous hydrocarbon to the said conversion temperature.

3. In the conversion of a normally gaseous hydrocarbon selected from the paraffinic and olefinic series into liquid hydrocarbons by heat treatment at a temperature, between 400° and 1100° C., sufficient for carrying into effect this conversion, the steps of charging the said gaseous hydrocarbon with up to about 2 per cent by volume of cadmium vapor at a temperature which lies so much above the melting point of cadmium that at the pressure employed the cadmium vapor may be introduced into said gaseous hydrocarbon in an amount of at least 0.01 per cent with reference to this hydrocarbon, but below the said conversion temperature, and then heating said gaseous hydrocarbon to the said conversion temperature.

FRITZ WINKLER.
HANS HAEUBER.